UNITED STATES PATENT OFFICE.

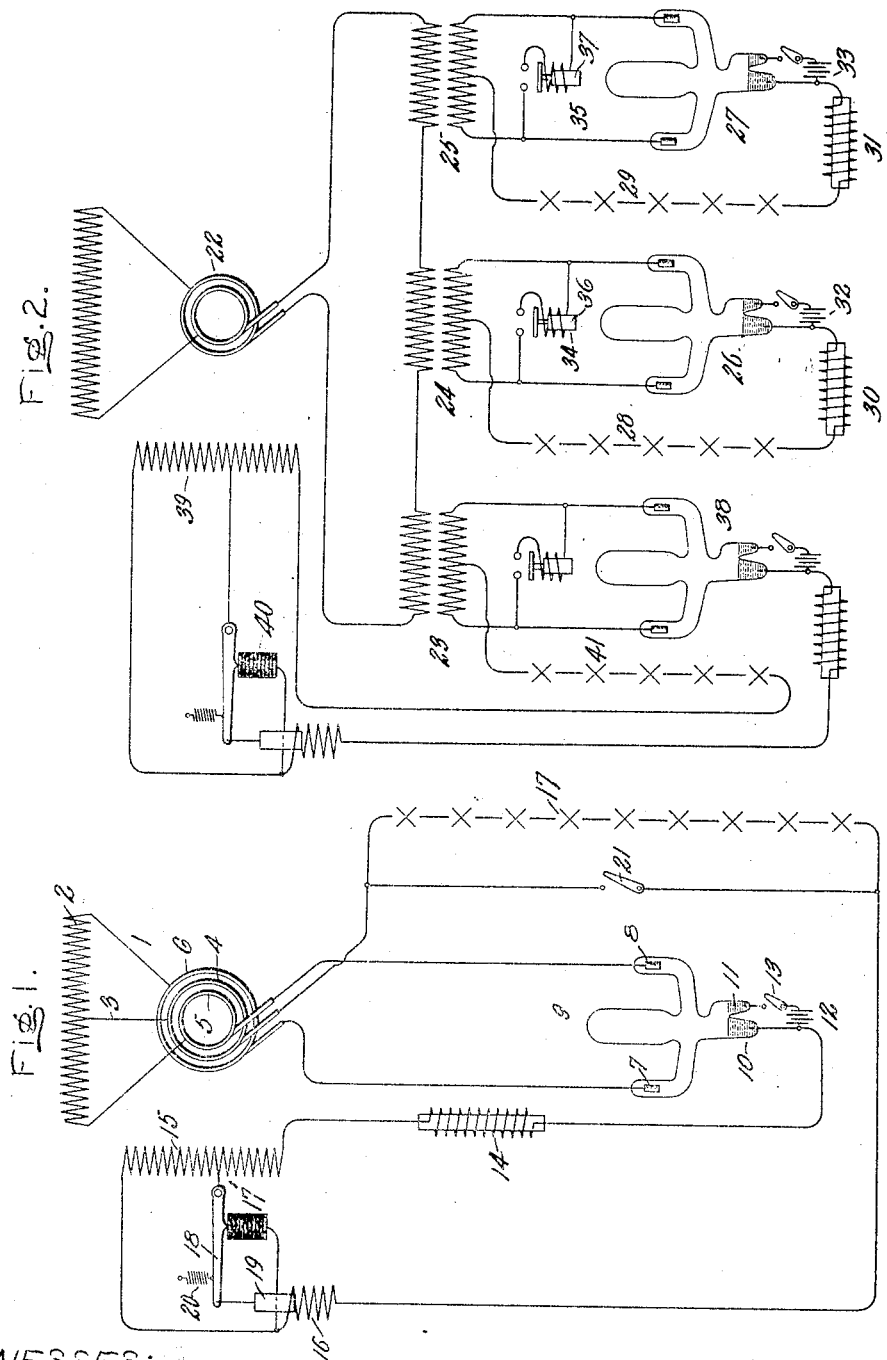

CHARLES M. GREEN, OF LYNN, MASSACHUSETTS, ASSIGNOR TO GENERAL ELECTRIC COMPANY, A CORPORATION OF NEW YORK.

VAPOR-RECTIFIER SYSTEM.

996,848.  Specification of Letters Patent.  Patented July 4, 1911.

Application filed August 11, 1905. Serial No. 273,807.

*To all whom it may concern:*

Be it known that I, CHARLES M. GREEN, a citizen of the United States, residing at Lynn, county of Essex, State of Massachusetts, have invented certain new and useful Improvements in Vapor-Rectifier Systems, of which the following is a specification.

My present invention relates to systems of electrical distribution in which vapor rectifiers are utilized to convert alternating current into unidirectional current for use in translating devices.

In carrying out my invention I use an alternating current source for supplying energy to one or more rectifiers and I utilize the resulting rectified current for operating one or more series circuits containing translating devices. If desired, I may utilize unidirectional current from one of the rectifiers to operate regulating means for automatically controlling the voltage of the alternating current source.

The details of my invention will be better understood by reference to the following description taken in connection with the drawing forming a part of this specification.

Figure 1 shows a single-phase alternator connected to a mercury rectifier and having a central tap connected to a consumption circuit supplied by current from the rectifier; and Fig. 2 shows a plurality of rectifiers connected to separate series circuits and also shows means for utilizing the unidirectional current from one of these rectifiers to energize the field of the alternator.

The alternator 1 may be similar in design to any of the standard forms of alternators such as for instance, the revolving armature, the revolving field or the inductor type, though for simplicity of illustration I have shown one of the revolving armature type. The armature winding 2 is provided with a central tap 3 connected to a slip ring 4 to serve as a return path for the undirectional current from the series consumption circuit. The terminals of the alternator winding 2 are connected to the slip rings 5 and 6, and these are connected through brushes to the carbon anodes 7 and 8 of a mercury rectifier 9 of a well-known type. This rectifier carries at its lower end a mercury cathode 10 and an auxiliary anode 11. The latter may be supplied by current from a battery 12 through a switch 13. This auxiliary anode 11 is utilized to start the flow of current through the rectifier, for it has been found that if the mercury electrodes 10 and 11 are brought momentarily in contact by shaking the tube, thereby establishing a flow of current from the battery 12, a subsequent separation of these electrodes will start an incipient arc in the lower end of the tube and this will kindle the main arcs between the mercury cathode 10 and the anodes 7 and 8. If desired, the switch 13 may be left closed to maintain a continuous direct current arc in the lower end of the rectifier but it has been found that such an arc is not necessary to maintain the rectifier in a conductive condition provided the alternator winding has a considerable reactance between the two halves, and provided also that the consumption circuit contains sufficient reactance to smooth out irregularities in the rectified current. The presence of reactance in the armature winding serves to displace the phase relation of current and pressure so that the arc from one anode is maintained for a short interval of time during which the pressure at the other anode is building up to a value sufficient to establish another arc in the tube. To insure sufficient reactance in the consumption circuit I may insert a reactive coil 14 in series therewith.

The rectified current passes from the cathode 10 through the field winding 15 of the alternator, and then through a series solenoid 16 to a load 17 which I have illustrated as consisting of a plurality of constant current arc lights, though it should be understood that my system is equally applicable to motors or other translating devices requiring substantially constant current. I may operate the alternator 1 on the drooping part of the characteristic, but to insure a constant current in the consumption circuit I may shunt a portion of the field 15 with a variable resistance 17′, consisting of a plurality of carbon plates, the upper one of which is in contact with the movable arm 18. The outer end of this arm carries a weight 19 of magnetic material counter-balanced by a coil spring 20. The weight 19 serves as an armature for the series solenoid 16 so that when the current in the solenoid reaches a predetermined value the downward pull on the armature 19 will compress the carbon plates 17′, thus decreasing the resistance of the path and shunting off a portion of the rectified current from the series field, thereby decreasing the voltage at the alternator terminals. Although I have described this particular form of field regulator it is to be understood that any approved type may be used to regulate the armature voltage sufficiently to produce constant current in the consumption circuit irrespective of changes in the resistance of the circuit. If desired, a switch 21 may be connected across the consumption circuit so that the alternator may be started on a low resistance circuit.

It will be readily understood that in case a very high voltage is necessary on the rectifier anodes, a step-up transformer may be interposed between the alternator and the rectifier, and the consumption circuit may return to a central tap of the transformer secondary, as a neutral point.

In Fig. 2 the alternator 22 supplies current to a plurality of series transformers 23, 24 and 25. By this arrangement of apparatus it is possible to operate any number of series translating devices from an alternator of moderate current capacity and variable potential. The transformers 24 and 25 are connected respectively to mercury rectifiers 26 and 27 which serve to rectify the alternating current, and which deliver unidirectional current to their respective series loads 28 and 29. Reactance coils 30 and 31 are connected in series with each of these consumption circuits to smooth out irregularities in the unidirectional current, and to help maintain the rectifiers conductive independent of current flow from the storage batteries 32 and 33. Automatic cut-outs 34 and 35 of any approved design are connected across the rectifier anodes so that in case of an open circuit in one of the consumption circuits, the abnormal potential developed across the corresponding transformer secondary will cause current to jump across the spark gap of the cut-out and thereby short circuit the secondary and prevent the development of an abnormal reactance in the transformer primary, which if present, would choke down the current of the alternator. These automatic cut-outs 34 and 35 are provided with electro-magnetic means such as armatures 36 and 37, so that after current has once jumped the air gap the secondaries will be short-circuited by a metallic connection. The third rectifier 38, shown in Fig. 2, is utilized to deliver unidirectional current to the alternator field 39 which is provided with a carbon regulator resistance 40, similar in all respects to that described in connection with Fig. 1. If desired this rectifier may also operate a suitable consumption circuit 41.

What I claim as new, and desire to secure by Letters Patent of the United States, is,—

1. The combination of an alternating current source, a mercury vapor rectifier having its anodes connected to the terminals of said source, a load circuit extending from said rectifier and connected to a point on said source, and means responsive to the direct current in said load circuit for varying the alternating voltage impressed across the anodes of said rectifier.

2. The combination of an alternating current source, a mercury vapor rectifier supplied with energy therefrom, a load circuit receiving continuous direct current from said rectifier and connected to a point on said source, a field winding connected in series with said load circuit, and means responsive to the current in the load circuit for varying the current in said winding.

3. The combination of a current source, a mercury vapor rectifier having its anodes connected thereto, a consumption circuit connected to the cathode of said rectifier, a central tap on said source connected to said consumption circuit, and automatic means operated by current from said rectifier for maintaining a substantially constant current in said consumption circuit.

4. The combination of a current source having a central tap, a vapor rectifier having anodes each of which is connected to said source and receives pulsating unidirectional current therefrom, a consumption circuit receiving continuous current from said rectifier and returning said current to said tap, and means controlled by said continuous current for automatically varying the voltage of said source to maintain said continuous current substantially constant.

5. The combination of an alternator, a transformer receiving current therefrom, a central tap on said transformer, a consumption circuit connected to said tap, a mercury rectifier connected to said transformer and taking current alternately from the windings on either side of said tap, said rectifier delivering continuous unidirectional current to said consumption circuit, a magnetizing winding for said alternator receiving continuous unidirectional current from said rectifier, and means for automatically varying the excitation of said magnetizing winding to maintain substantially constant current in the said consumption circuit.

6. The combination of an alternator, a plurality of transformers in circuit therewith, each having a central tap, mercury-vapor rectifiers each having anodes connected to one of said transformers and receiving unidirectional current pulsations therefrom, a consumption circuit receiving unidirectional current from one of said rectifiers, and a magnetizing winding for said alternator receiving continuous current from another of said rectifiers.

7. The combination of an alternating current source, a plurality of series transformers connected thereto, mercury rectifiers having anodes connected to said transformers, series consumption circuits receiving unidirectional current from said rectifiers, and means operated by unidirectional current from one of said rectifiers for maintaining substantially constant current in all said series consumption circuits.

8. The combination of an alternating current source, a plurality of mercury vapor rectifiers receiving energy therefrom, a series consumption circuit connected to one of said rectifiers and carrying continuous current, and means operated by current from a second rectifier for maintaining a substantially constant current in said consumption circuit.

9. The combination of a plurality of series consumption circuits, mercury vapor rectifiers for supplying current thereto, a plurality of transformers connected in series and supplying current to said rectifiers, and a single means operated by direct current from one of said consumption circuits for automatically maintaining substantially automatically maintaining substantially constant current in all said consumption circuits.

In witness whereof, I have hereunto set my hand this third day of August, 1905.

CHARLES M. GREEN.

Witnesses:
JOHN A. MCMANUS, Jr.,
JOHN J. WALKER.